US010323753B2

(12) United States Patent
Matthews, III et al.

(10) Patent No.: US 10,323,753 B2
(45) Date of Patent: Jun. 18, 2019

(54) GASKET SEAL SEAT RING

(71) Applicant: Pentair Valves & Controls US LP, Golden Valley, MN (US)

(72) Inventors: Kenneth Heidt Matthews, III, Kingwood, TX (US); Kevin Lewis Swicegood, Missouri City, TX (US)

(73) Assignee: Emerson Vulcan Holding LLC, St. Louis, MO (US)

( * ) Notice: Subject to any disclaimer, the term of this patent is extended or adjusted under 35 U.S.C. 154(b) by 130 days.

(21) Appl. No.: 15/471,950

(22) Filed: Mar. 28, 2017

(65) Prior Publication Data
US 2017/0292613 A1    Oct. 12, 2017

Related U.S. Application Data

(60) Provisional application No. 62/318,827, filed on Apr. 6, 2016.

(51) Int. Cl.
F16K 1/226    (2006.01)
(52) U.S. Cl.
CPC .................. F16K 1/2263 (2013.01)
(58) Field of Classification Search
CPC . F16K 1/42; F16K 1/425; F16K 1/427; F16K 1/465; F16K 1/2263; F16K 27/0218; F16K 27/0245; F16K 27/02; F16K 27/00; F16K 1/22; F16K 1/226; F16K 25/00; Y10T 137/6048; Y10T 137/6052
See application file for complete search history.

(56) References Cited

U.S. PATENT DOCUMENTS

| 3,472,284 | A | * | 10/1969 | Hosek | F16K 1/22 |
| | | | | | 137/68.23 |
| 3,739,589 | A | | 6/1973 | Wolfe | |
| 4,064,003 | A | * | 12/1977 | Newton | F22B 1/063 |
| | | | | | 137/68.28 |
| 4,225,112 | A | | 9/1980 | Libke | |
| 4,422,894 | A | | 12/1983 | Atkinson et al. | |
| 4,681,329 | A | | 7/1987 | Contin | |
| 6,431,383 | B1 | | 8/2002 | Mozley et al. | |
| 7,193,491 | B2 | | 3/2007 | Leadley-Brown et al. | |
| 2001/0005007 | A1 | | 6/2001 | Eggleston | |
| 2005/0087930 | A1 | | 4/2005 | D'Amico et al. | |
| 2005/0252560 | A1 | * | 11/2005 | Anderson | F16K 11/0876 |
| | | | | | 137/625.47 |
| 2011/0260413 | A1 | | 10/2011 | Voltenburg et al. | |
| 2013/0168590 | A1 | | 7/2013 | Zlindra et al. | |

(Continued)

OTHER PUBLICATIONS

Angle Valve; MDC Vacuum Products, LLC; retrieved from the Internet Nov. 6, 2017; <https://www.mdcvacuum.com/DisplayContentPage.aspx?cc=74584585-27e6-4bad-a6e1-3939e2acc984>.

(Continued)

Primary Examiner — Marina A Tietjen
(74) Attorney, Agent, or Firm — Quarles & Brady LLP

(57) ABSTRACT

Some embodiments of the invention provide a valve including a body, a valve element arranged within the body to selectively inhibit flow through the body, and a seal assembly that includes a body gasket and a retaining ring. The retaining ring includes a cutter that is arranged to cut the body gasket during installation. A two-plane seal is formed by cutting the body gasket between the retaining ring and the body.

17 Claims, 16 Drawing Sheets

(56) References Cited

U.S. PATENT DOCUMENTS

2013/0193651 A1    8/2013   Fracz et al.
2014/0231689 A1    8/2014   Knutsson

OTHER PUBLICATIONS

Keystone Model Winn Hiseal High Performance Butterfly Valves; Copyright 2012 Pentair Ltd.; 4 pages.
International Search Report for PCT/US2017/24552; dated Jun. 19, 2017; 3 pages.

\* cited by examiner

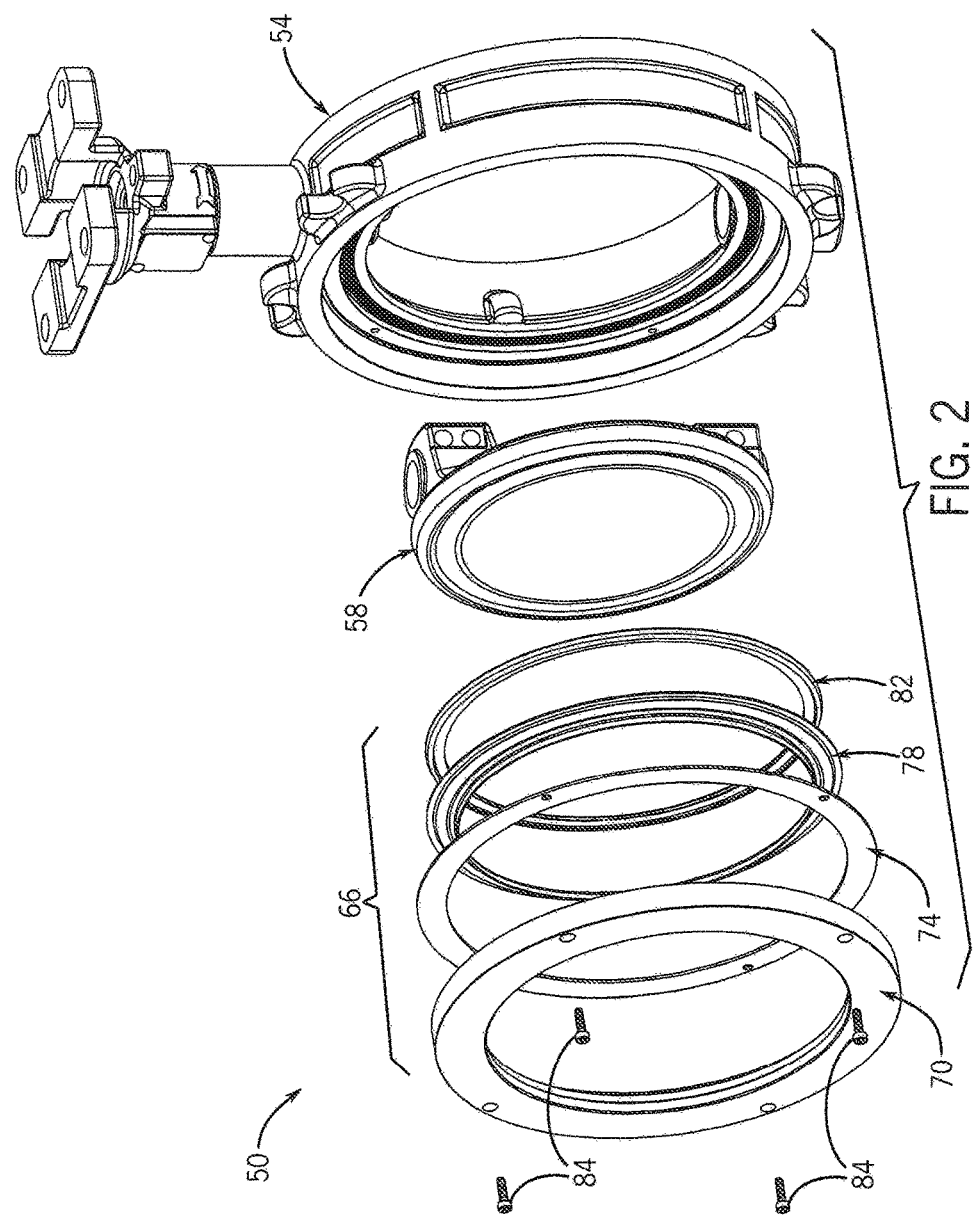

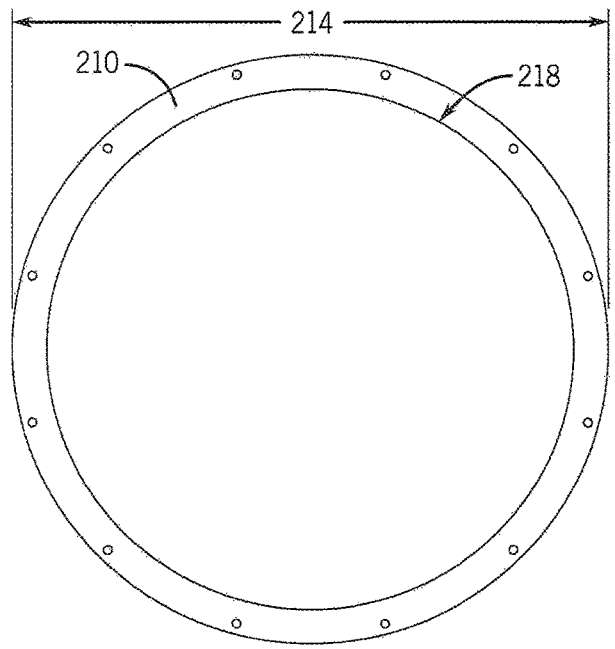
FIG. 20
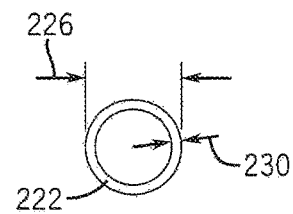
FIG. 21
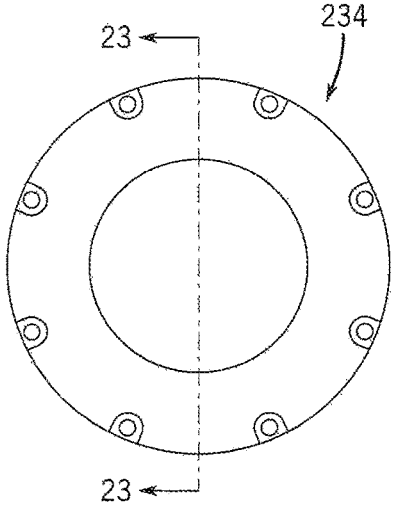
FIG. 22
FIG. 23
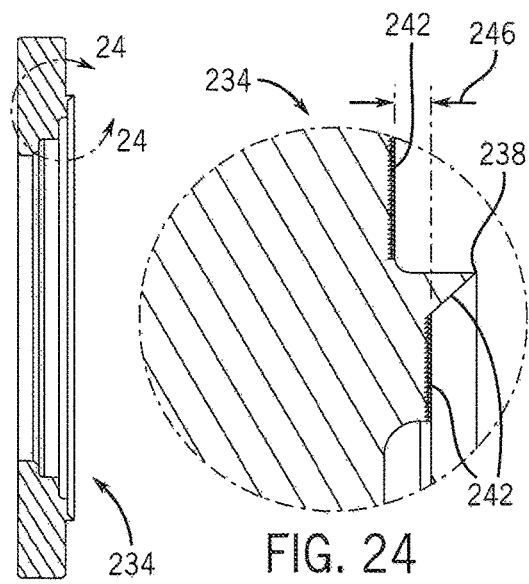
FIG. 24

GASKET SEAL SEAT RING

CROSS-REFERENCE TO RELATED APPLICATIONS

This application claims the benefit of U.S. Provisional Patent Application Ser. No. 62/318,827, entitled "Gasket Seal Seat Ring" and filed on Apr. 7, 2016. The entire disclosure of such document is incorporated herein in its entirety.

BACKGROUND

Valve designs can employ multiple methods of installation of the sealing element in their design. High performance double offset valves generally hold the sealing element between the primary body section and a secondary removable seat retainer. This joint connection must be sealed, or leakage between the body and seat retainer ring may occur. In "end of line service" the seat retainer ring must hold the rated differential of the valve without support from the low pressure side mating flange. Accurate placement of the seal between the two components, seal integrity during handling and an efficient assembly process are essential.

SUMMARY OF THE INVENTION

Industry standards and market-driven pressure for design efficiency have pushed valve designers to try and seal with smaller surface areas. The proposed device allows for an initial sealing media (e.g., gasket) to be applied to multiple sealing planes within a pressure system and allows for sealing media to adjust to geometric differences within the pressure system.

Some embodiments of the invention provide a valve including a body, a valve element arranged within the body to selectively inhibit flow through the body, and a seal assembly that includes a body gasket and a retaining ring with a cutting or separating feature. The cutter is arranged to cut or separate the gasket into discreet components during installation so a multi-plane seal is formed by the cut gasket between the retaining ring and the body.

In some embodiments, the body gasket is cut into first and second segments that are spaced apart along a flow axis of the valve.

In some embodiments, the seal assembly further comprises a metal seat with at least a portion of the metal seat positioned between the valve body and the second seal segment after assembly of the valve.

In some embodiments, the valve further comprises a soft seat positioned between the metal seat and the valve body after assembly of the valve, the soft seat configured to engage and seal with a disk of the valve.

In some embodiments, the cutter engages a shearing wall positioned along the valve body such that engagement of the cutter with the shearing wall cuts the gasket body.

In some embodiments, the cutter is integral with the retaining ring. In other embodiments, the cutter is separate from the retaining ring.

Some embodiments of the invention provide a valve including a body, a valve element arranged within the body to selectively inhibit flow through the body, and a seal assembly including a non-laminated graphite gasket and a retaining ring, the retaining ring including a cutter that is arranged to cut the gasket during installation to form a first portion defining a first segment having a first width and a second portion cut from the non-laminated graphite gasket during installation and defining a second segment having a second width that is less than the first width.

In some embodiments, the first and second segments are spaced apart along a flow axis of the valve.

In some embodiments, the seal assembly further comprises a metal seat positioned between the valve body and the second segment after assembly of the valve.

In some embodiments, the valve further comprises a soft seat positioned between the metal seat and the valve body after assembly of the valve, the soft seat configured to engage and seal with a disk of the valve.

In some embodiments, the cutter is integral with the retaining ring. In other embodiments, the cutter is separate from the retaining ring.

Some embodiments of the invention provide a method of assembling a valve, the method comprising the steps of providing a valve comprising a body, a valve element arranged within the body to selectively inhibit flow through the body, and a seal assembly including a body gasket and a retaining ring, the retaining ring including a cutter, positioning the gasket body adjacent the valve body, positioning the retaining ring adjacent the gasket body, such that the gasket body is positioned between the retaining ring and the valve body, and pressing the retaining ring into engagement with the gasket body, thereby cutting the gasket body with the cutter of the retaining ring.

In some embodiments, the method further includes the step of engaging the cutter against a shearing wall of the valve body to cut the gasket body.

In some embodiments, the method further includes the step of positioning a metal seat against the valve body prior to positioning the gasket body and the retaining ring, such that at least a portion of the metal seat is positioned between the gasket body and the valve body.

In some embodiments, the method further includes the step of positioning a soft seat against the valve body prior to positioning the gasket body, the retaining ring, and the metal seat, such that the soft seat is positioned between the metal seat and the valve body.

In some embodiments, the cutting step includes cutting the gasket body into a first, outer segment having a first width and a second, inner segment having a second width, the second width being less than the first width.

In some embodiments, the first, outer segment is spaced apart from the second, inner segment along a flow axis of the valve.

In some embodiments, the method allows of sizing of first and second gasket segments during installation of the gasket body.

BRIEF DESCRIPTION OF DRAWINGS

FIG. 2 is an exploded view of the butterfly valve of FIG. 1.

FIG. 20 is a front view of a body gasket according to another embodiment.

FIG. 21 is a body gasket according to yet another embodiment.

FIG. 22 is a front view of a retaining ring according to another embodiment.

FIG. 23 is a sectional view of the retaining ring taken along line 23-23 of FIG. 22.

FIG. 24 is a detail view of the retaining ring taken within line 24-24.

DETAILED DESCRIPTION OF THE INVENTION

Figure 1:
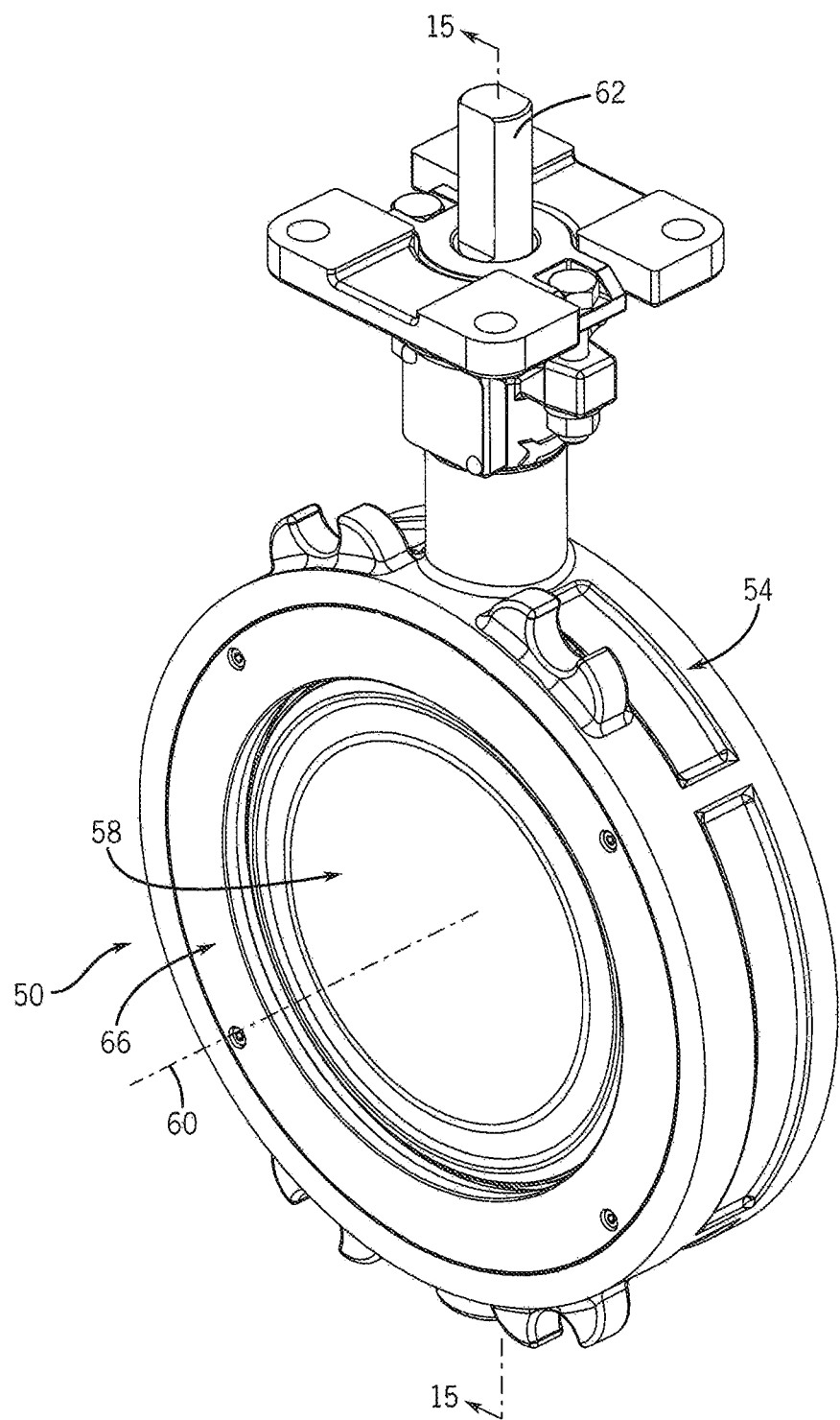
FIG. 1 is a perspective view of a butterfly valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 shows a butterfly valve 50 that includes a body 54, a disk 58 rotatable between an open position and a closed position for selectively providing and inhibiting flow along a flow axis 60, a shaft 62 coupled to the disk 58 to cause rotation of the disk 58, and a sealing assembly 66. The butterfly valve 50 may be used for controlling the flow of fluids or gases. As shown in FIG. 2, the sealing assembly 66 includes a retaining ring 70, a body gasket 74, a metal seat 78, and a soft seat 82. Multiple arrangements of seats 78 and 82 are potentially available for end user selection. Fasteners 84 may couple the sealing assembly 66 to the body 54. Various arrangements of fasteners 84 may be present as valve 50 design requirements change. For example, the fasteners 84 may be screws, bolts, clips, clamps, or any other suitable fastening mechanism. Still further, the fasteners 84 need not all be the same.

Figure 4:
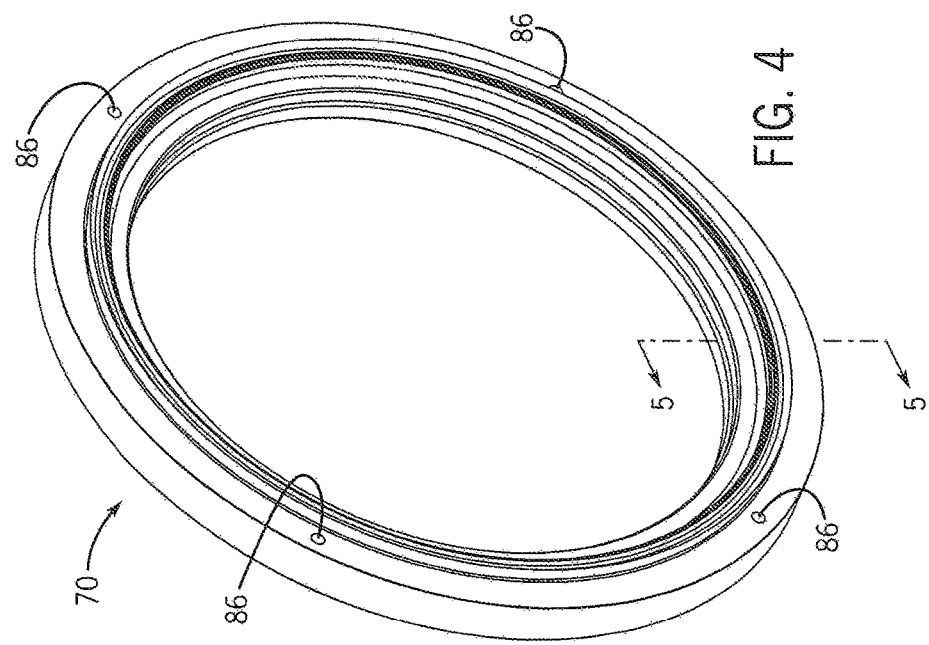
FIG. 4 is a top, rear perspective view of the retaining ring of FIG. 3.
Figure 3:
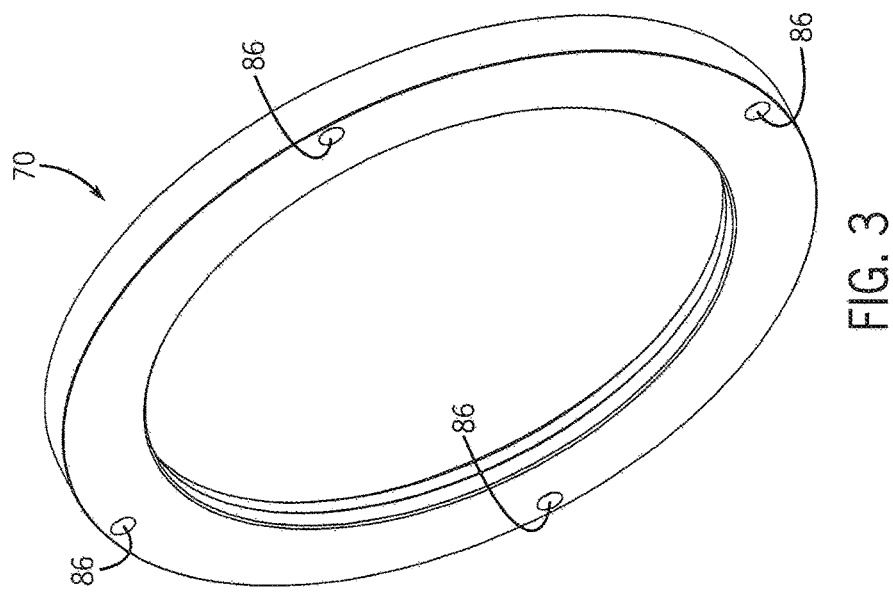
FIG. 3 is a top, front perspective view of a retaining ring of the butterfly valve of FIG. 1.
Figure 5:
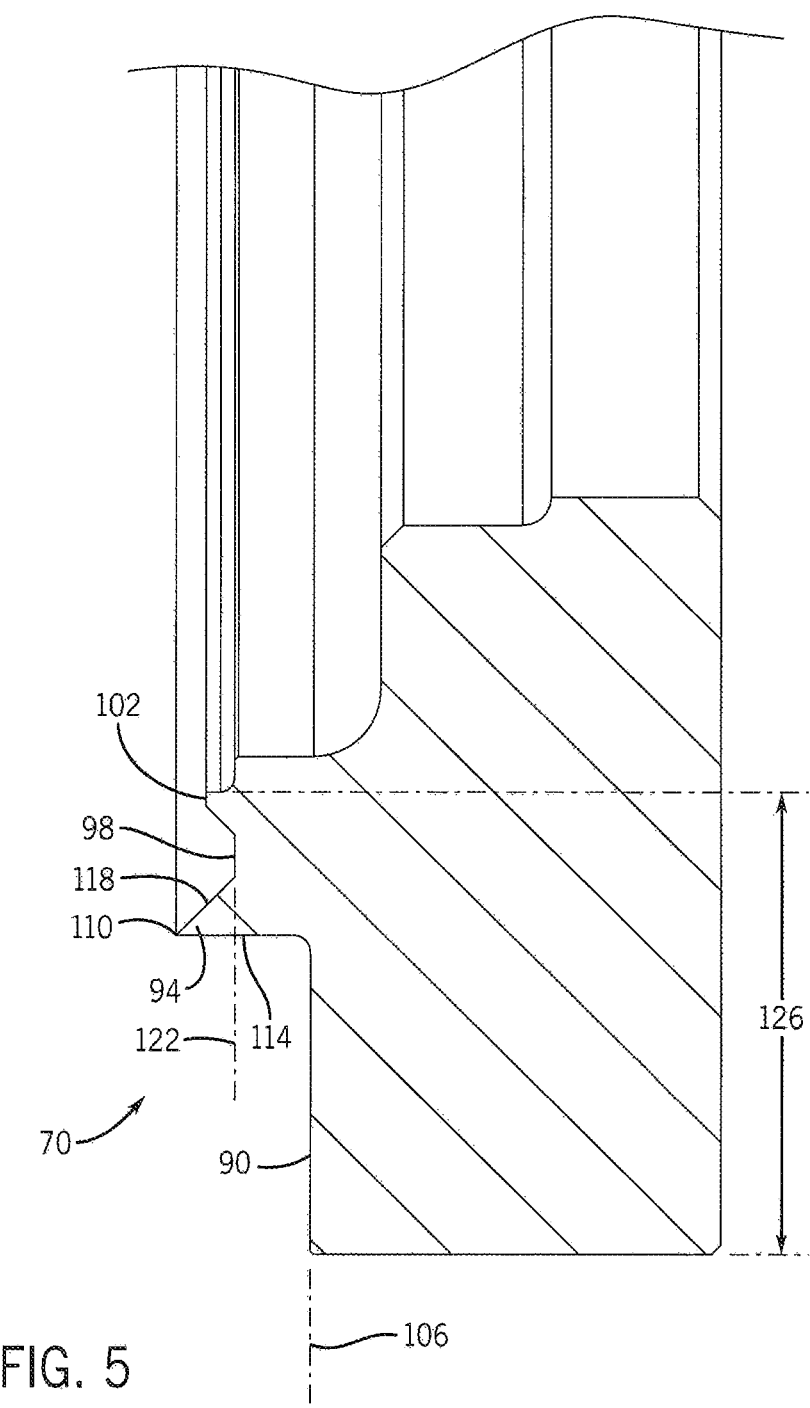
FIG. 5 is a sectional view of the retaining ring taken along the line 5-5 of FIG. 4.

As shown in FIGS. 3 and 4, the retaining ring 70 includes a plurality of counterbored through-holes 86 that are arranged to facilitate fastening the sealing assembly 66 to the body 54, however, depending on the design, these are not necessarily present. With reference to FIG. 5, the retaining ring 70 includes a primary ring gasket seat 90, a cutter 94, a secondary ring gasket seat 98, and a ring shoulder 102. The primary ring gasket seat 90 defines a primary seat plane 106 and is substantially flat. In other embodiments, the primary ring gasket seat 90 may define a shaped profile (e.g., a frustoconical, or curved profile). The cutter 94 is arranged between the primary ring gasket seat 90 and the secondary ring gasket seat 98 and may define a sharpened edge 110, a flat wall 114, and a sloped wall 118. The secondary ring gasket seat 98 may define a secondary seat plane 122 spaced apart from the primary seat plane 106 axially along the flow axis 60. A seat width 126 is defined between the ring shoulder 102 and an outer periphery of the primary ring gasket seat 90.

Figure 7:
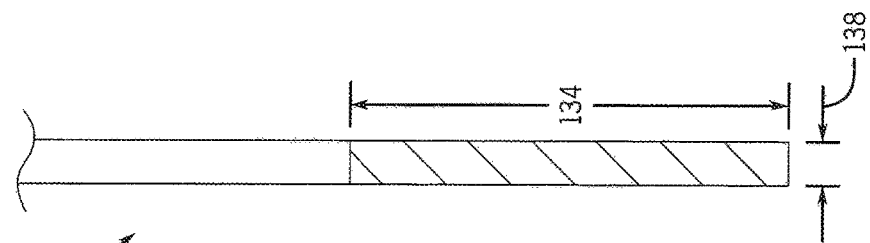
FIG. 7 is a sectional view of the body gasket taken along line 7-7 of FIG. 6.
Figure 6:
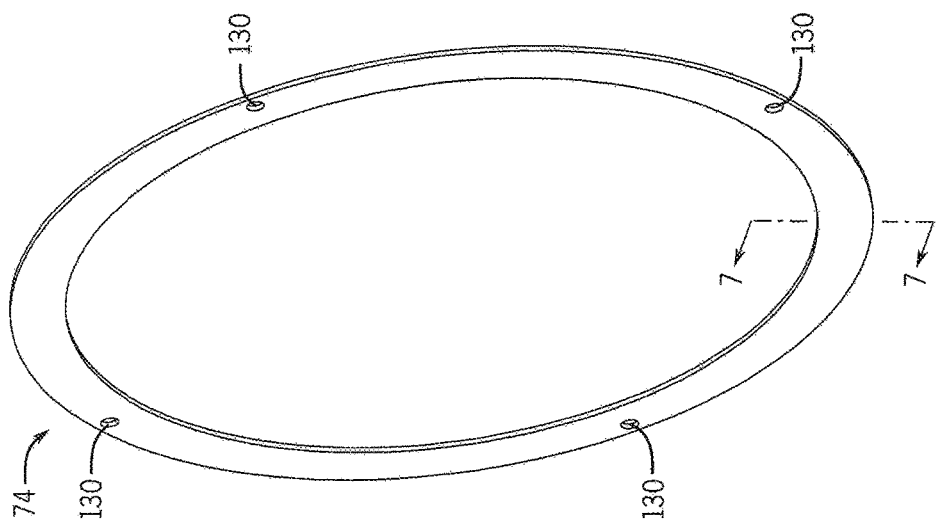
FIG. 6 is a top, front perspective view of a body gasket of the butterfly valve of FIG. 1.

As shown in FIG. 6, the body gasket 74 is annular and may include apertures 130 arranged to align with the through-holes 86 formed in the retaining ring 70. With reference to FIG. 7, the body gasket 74 defines a gasket width 134 that is sized to be at least as wide as the seat width 126 of the retaining ring 70. The body gasket 74 also defines a gasket thickness 138.

Figure 9:
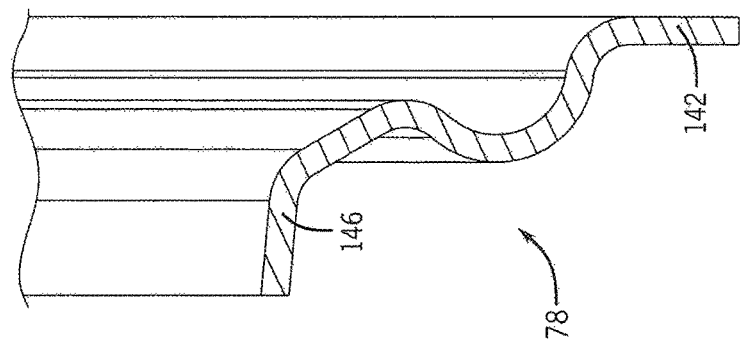
FIG. 9 is a sectional view of the metal seat taken along line 9-9 of FIG. 8.
Figure 8:
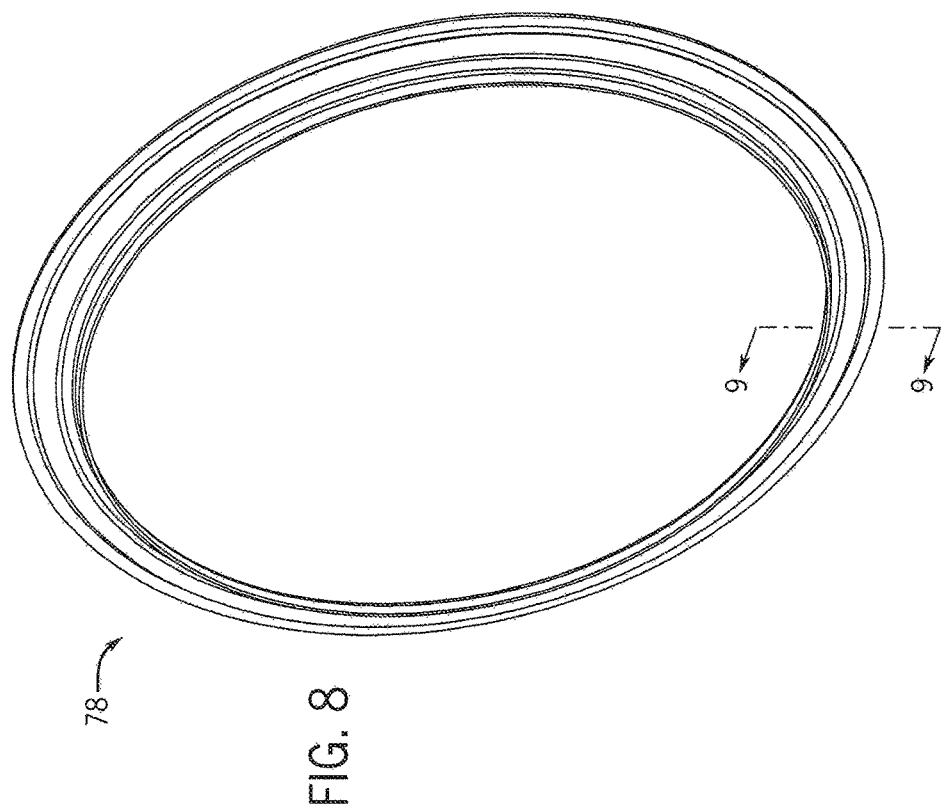
FIG. 8 is a top, front perspective view of a metal seat of the butterfly valve of FIG. 1.

As shown in FIG. 8, the metal seat 78 is annular and may be formed out of stamped metal. With reference to FIG. 9, the metal seat 78 includes a metal flange 142 and a metal sealing portion 146. The metal seat 78 is flexible enough to engage and disengage the disk 58 during operation of the butterfly valve 50. In one embodiment, the seat 78 is formed from metal.

Figure 11:
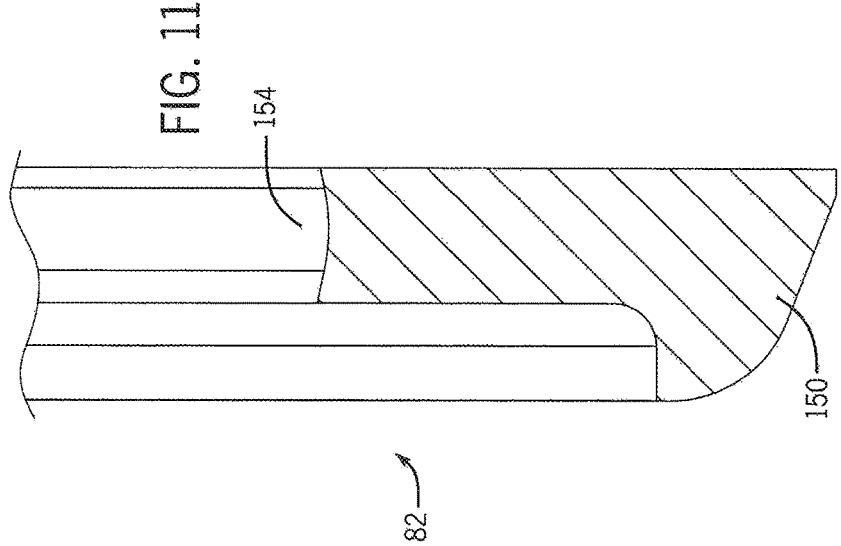
FIG. 11 is a sectional view of the soft seat taken along line 11-11 of FIG. 10.
Figure 10:
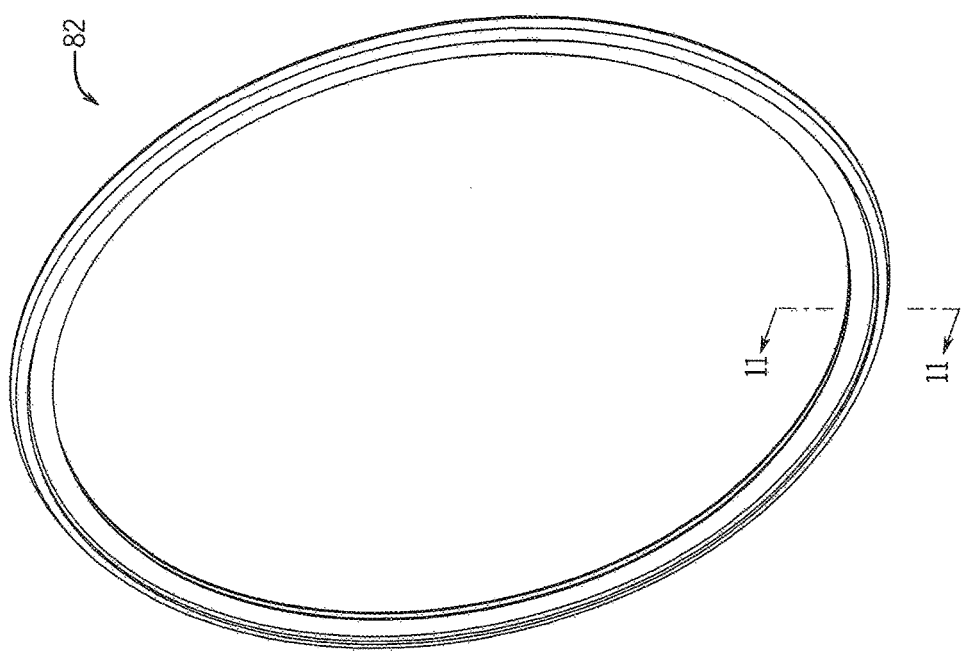
FIG. 10 is a top, front perspective view of a soft seat of the butterfly valve of FIG. 1.

As shown in FIG. 10, the soft seat 82 is annular and may be formed of a plastic or polymeric material. With reference to FIG. 11, the soft seat 82 includes a head portion 150 and a sealing surface 154 arranged to engage and disengage the disk 58 during operation of the butterfly valve 50. In one embodiment, the soft seat 82 is formed from PTFE plastic.

Figure 12:
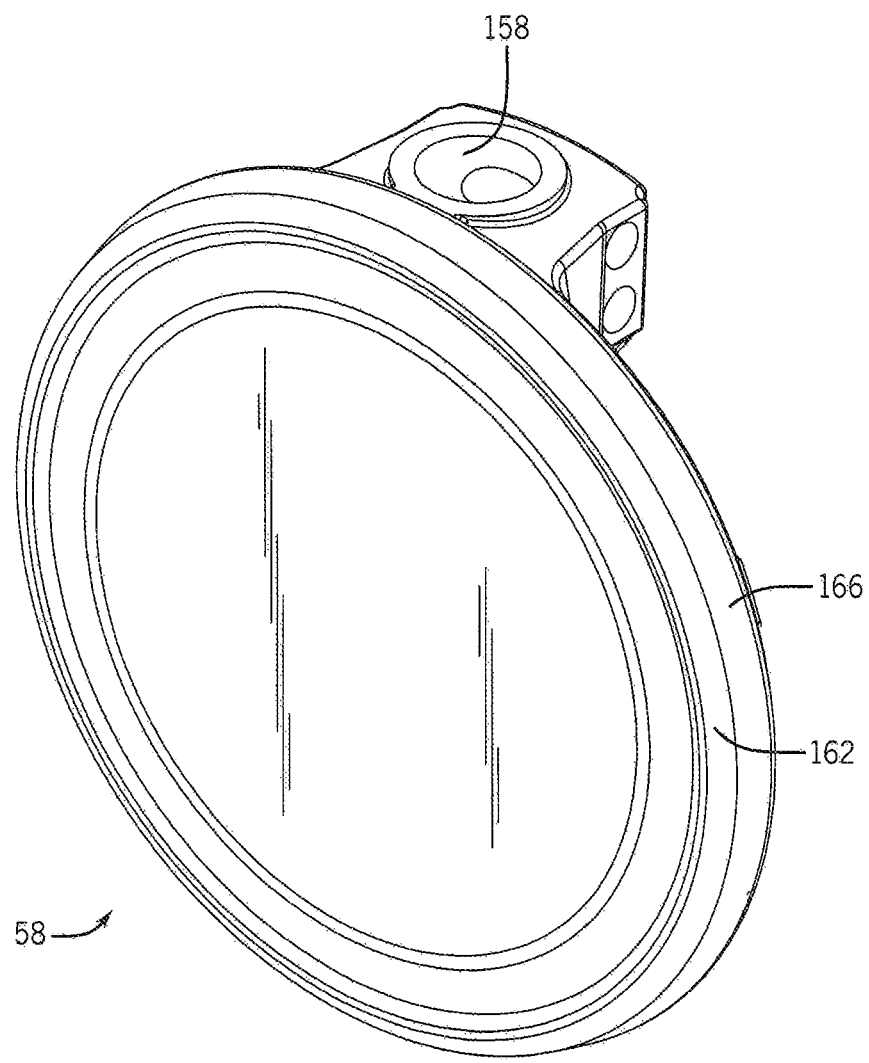
FIG. 12 is a top, front perspective view of a disk of the butterfly valve of FIG. 1.

As shown in FIG. 12, the disk 58 includes a shaft aperture 158 sized to receive the shaft 62, a metal sealing portion 162 arranged to selectively engage the metal seat 78, and a soft sealing portion 166 arranged to selectively engage the soft seat 82.

Figure 13:
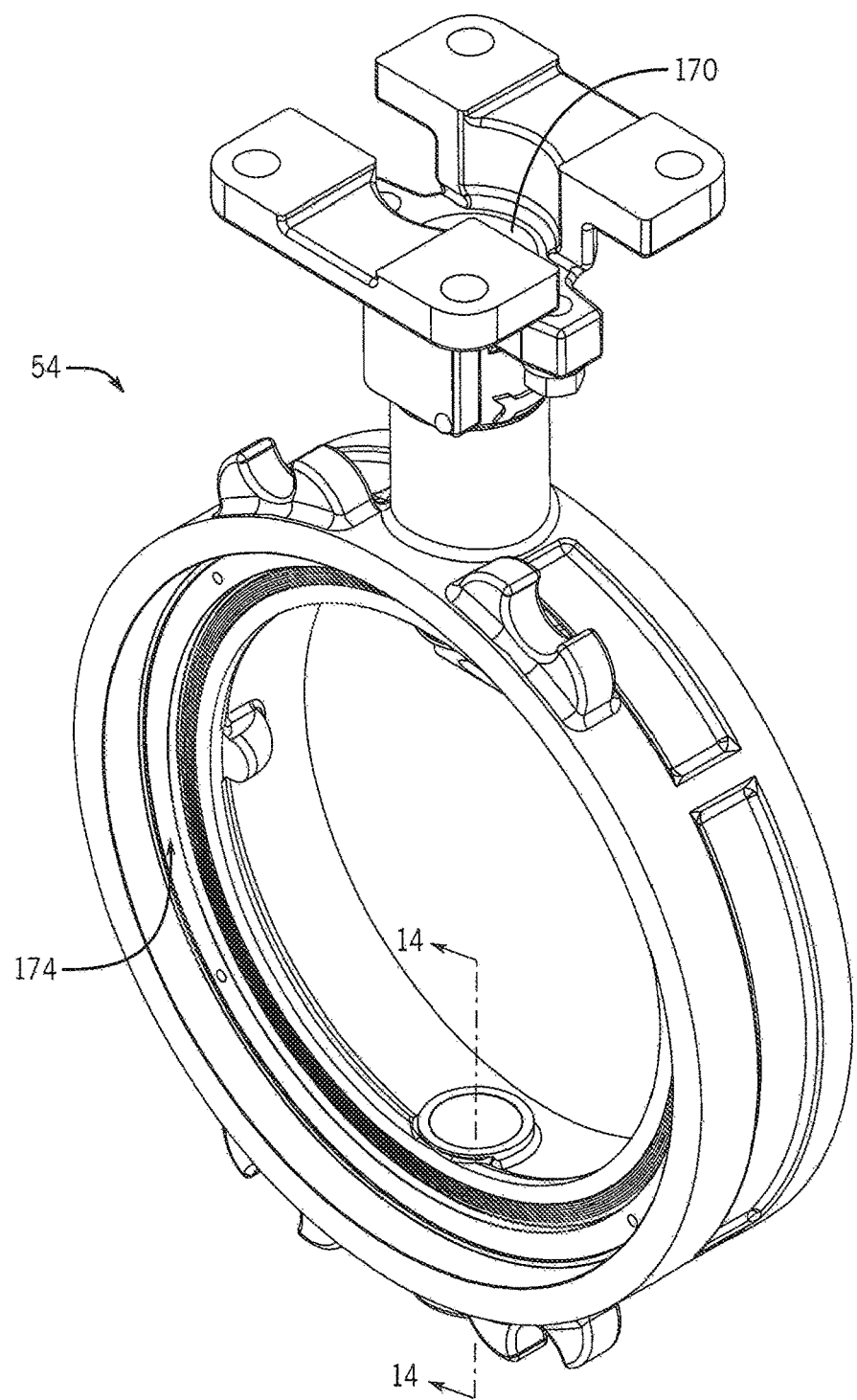
FIG. 13 is a top, front perspective view of a body of the butterfly valve of FIG. 1.
Figure 14:
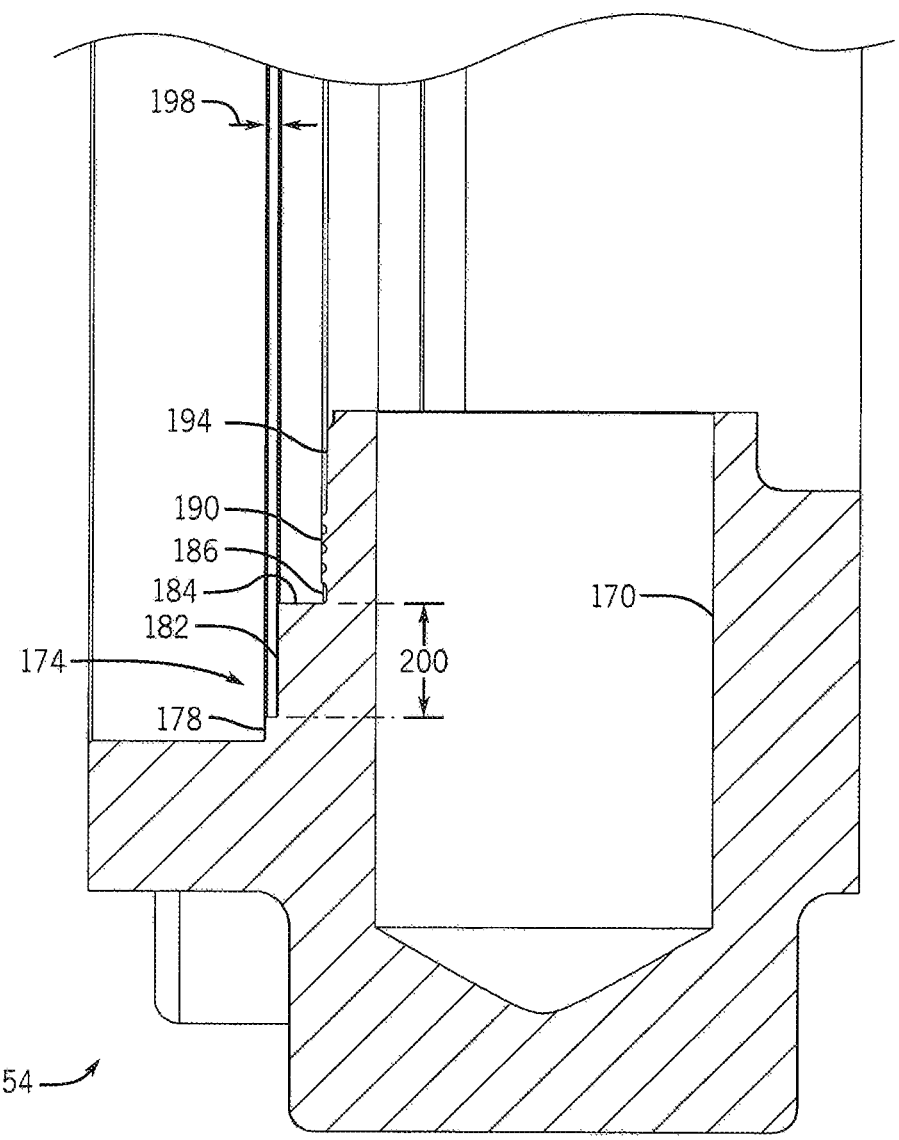
FIG. 14 is a sectional view of the body taken along line 14-14 of FIG. 13.

As shown in FIG. 13, the body 54 includes a body shaft aperture 170 sized to receive the shaft 62 and aligned with the shaft aperture 158, and further includes a seal recess 174. With reference to FIG. 14, the seal recess 174 is defined by a body shoulder 178, a primary body gasket seat 182, a shearing wall 184, an anvil surface 186, a clamping portion 190, and a soft seat portion 194. The body shoulder 178 defines a body shoulder height 198 that is sized relative to the body gasket 74 to provide a predetermined degree of compression. The primary body gasket seat 182 defines a primary body seat width 200. The anvil surface 186 defines a flat, solid surface and is arranged to interact with the cutter 94. The clamping portion 190 defines a textured surface in the form of grooves which may or may not be required for the functionality of the design.

Figure 15:
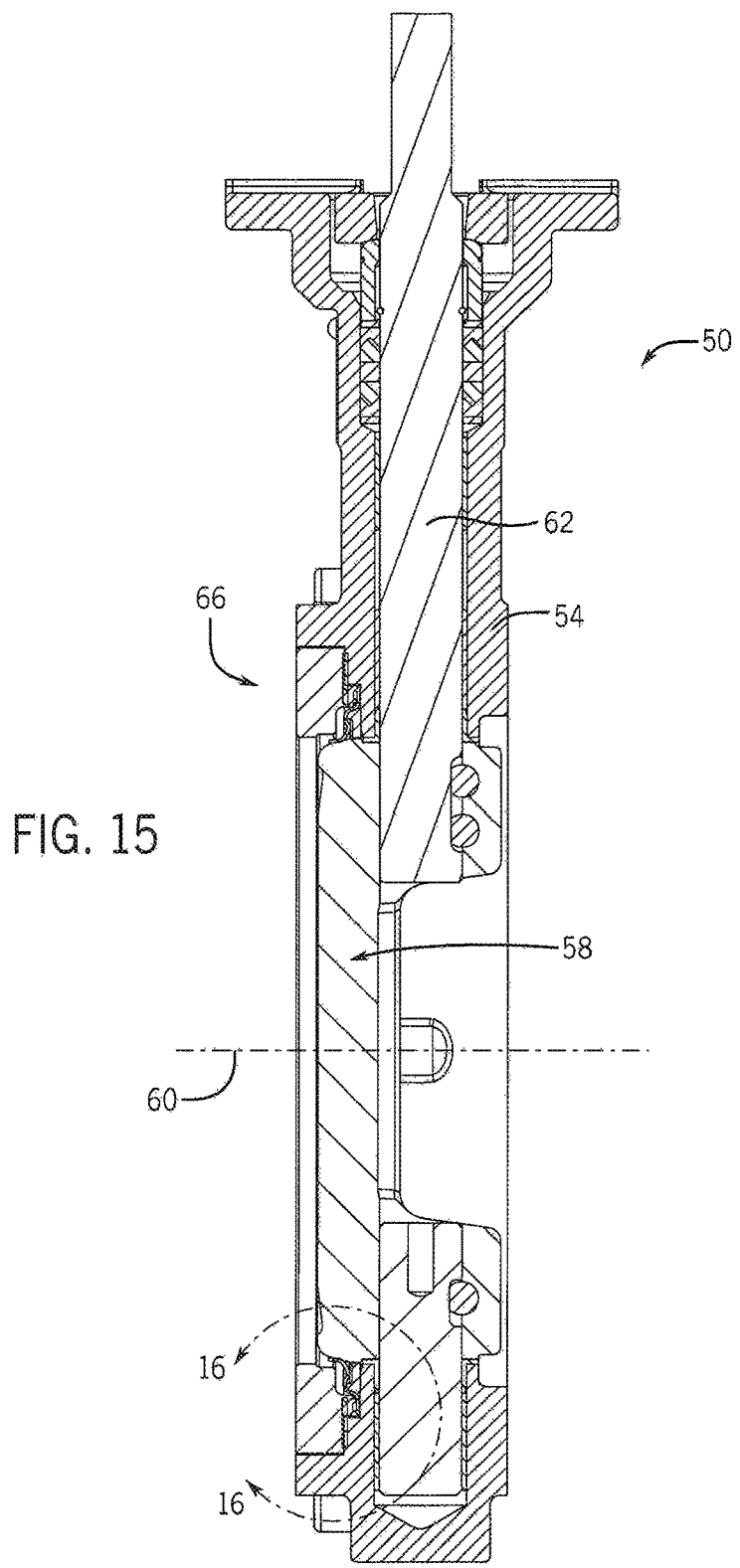
FIG. 15 is a sectional view of the butterfly valve taken along line 15-15 of FIG. 1.

As shown in FIG. 15, the assembled butterfly valve 50 inhibits fluid flow past the disk 58 when in the closed position. The shaft 62 can be actuated to move the disk 58 between the open position and the closed position.

Figure 16:
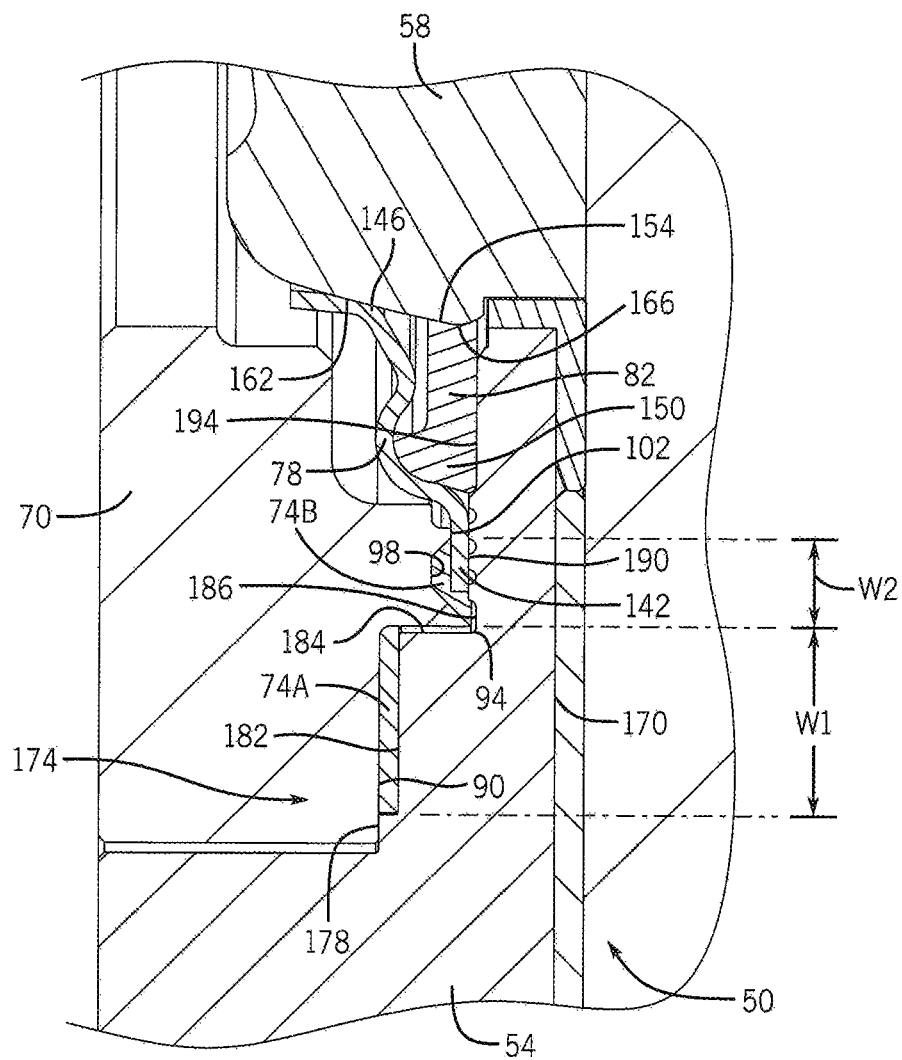
FIG. 16 is a detail view of the butterfly valve taken within circle 16-16 of FIG. 15.

FIG. 16 illustrates the assembly of the butterfly valve 50. The soft seat 82 is first placed into the seal recess 174 abutting the soft seat portion 194 of the body 54. Then, the metal seat 78 is inserted such that the metal flange 142 abuts the clamping portion 190 of the body 54 and the soft seat 82 is captured between the metal seat 78 and the soft seat portion 194. The body gasket 74 is then inserted into the seal recess 174 radially inside the body shoulder 178 as a single piece, as shown in FIG. 6. When first inserted, the body gasket 74 extends radially beyond the shearing wall 184 in an inward direction. That is to say, the gasket width 134 is larger than the primary body seat width 200, as shown in FIG. 14. With the body gasket 74 seated, the retaining ring 70 is inserted into the seal recess 174 such that the cutter 94 engages the body gasket 74 adjacent the shearing wall 184. Load is applied either via fasteners or machine resulting in the cutter 94 and the shearing wall 184 cooperating to cleanly cut the body gasket 74 into a primary portion 74A and an inner secondary portion 74B. If present, the fasteners 84 are tightened to a predetermined torque that results in the outer portions of the primary ring gasket seat 90 of the retaining ring 70 making hard contact with the body shoulder 178. This hard contact provides a predetermined compression of the body gasket 74. Additionally, the ring shoulder 102 of the retaining ring 70 makes hard contact with the metal flange 142, compressing the metal flange 142 between the clamping portion 190 of the body 54 and the ring shoulder 102. When fully tightened, the primary portion 74A is compressed between the primary ring gasket seat 90 and the primary body gasket seat 182, and the secondary portion 74B is compressed between the secondary ring gasket seat 98, the anvil portion 186, the metal flange 142, and the ring shoulder 102. The secondary portion 74B is deformed during the tightening process to fill in any voids.

The arrangement of the body shoulder 178 and the ring shoulder 102 provide a predetermined compression of the body gasket 74 and inhibit overtightening/overcompression.

In some embodiments, the primary seal portion 74A may have a width W1 (FIG. 16) that is greater than a width W2 of the secondary seal portion 74B. In other embodiments, the widths W1, W2 may be the same or W1 may be less than W2. In some embodiments, the body gasket may be a non-laminated graphite gasket.

Figure 19:
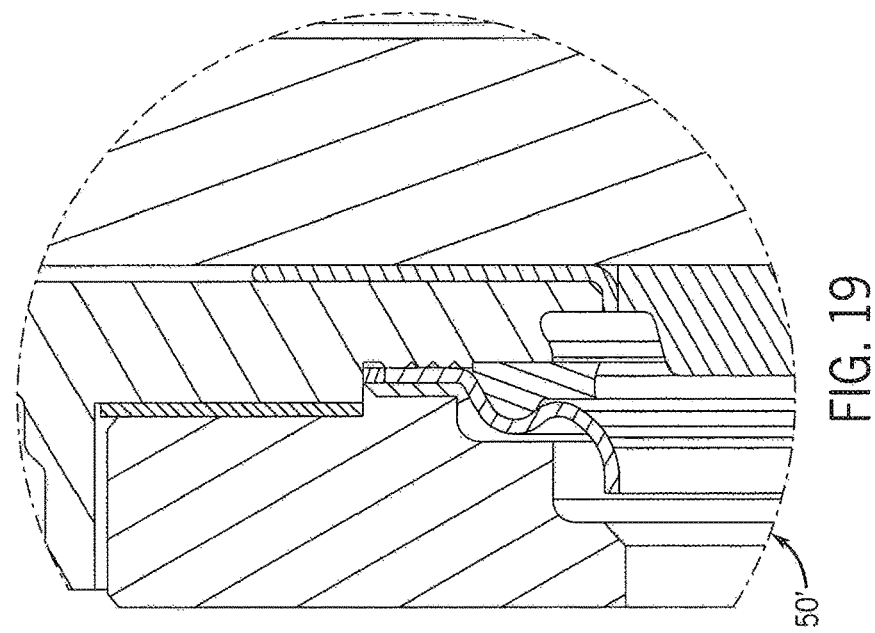
FIG. 19 is a detail view of the butterfly valve taken within circle 19-19 of FIG. 18.
Figure 18:
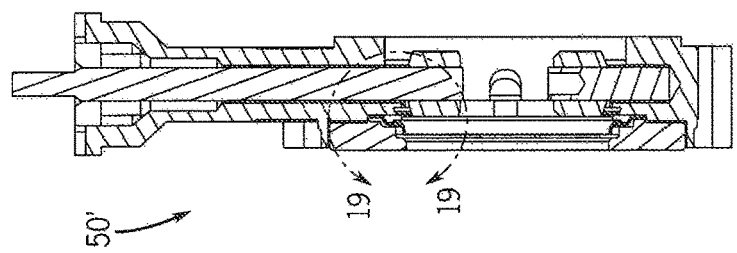
FIG. 18 is a sectional view of the butterfly valve taken along line 18-18 of FIG. 17.
Figure 17:
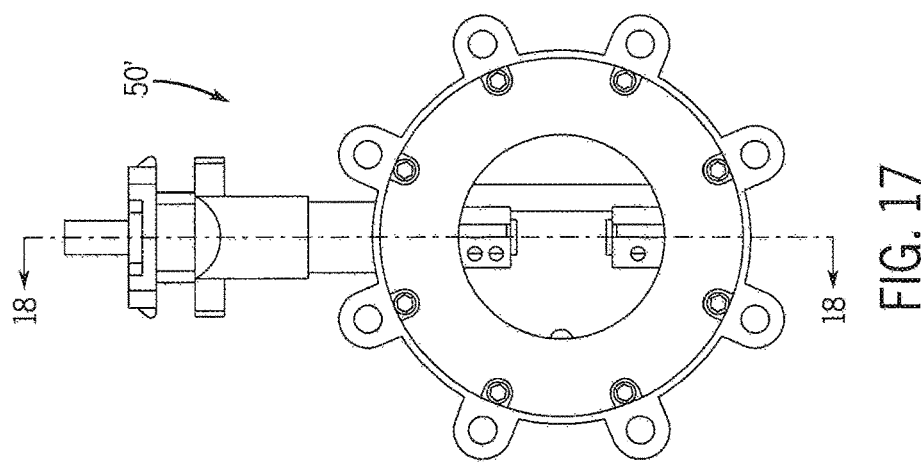
FIG. 17 is a front view of a butterfly valve according to another embodiment.

FIGS. 17-19 show another butterfly valve 50' that is similar to the butterfly valve 50 discussed above.

FIG. 20 shows a body gasket 210 that defines an outer diameter 214 of about forty inches (40") and a gasket width 218 of about two and forty-five hundredths inches (2.45"). This is a standard size for a thirty-six inch gasket.

FIG. 21 shows a body gasket 222 that defines an outer diameter 226 of about six inches (6") and a gasket width 230 of about sixty-six hundredths inches (0.66"). This is a standard size for a four-inch gasket. Both of the gaskets of FIGS. 20 and 21 are examples of gaskets that may be used with the above described embodiments to provide a cut-during-installation, self-centered, two-plane body gasket.

FIGS. 22-24 show another retainer ring 234 that includes a cutter 238, sealing surfaces 242, and a sealing plane offset 246 of about six hundredths of an inch (0.06").

Figure 27:
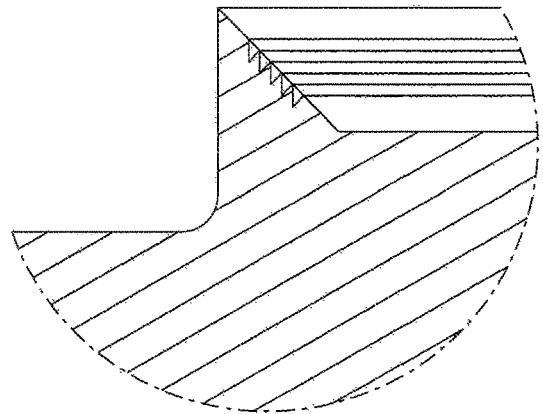
FIG. 27 is a detailed sectional view of a cutting profile of a retaining ring according to yet another embodiment.
Figure 26:
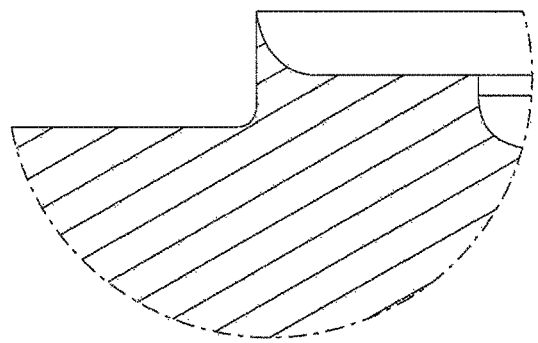
FIG. 26 is a detailed sectional view of a cutting profile of a retaining ring according to another embodiment.
Figure 25:
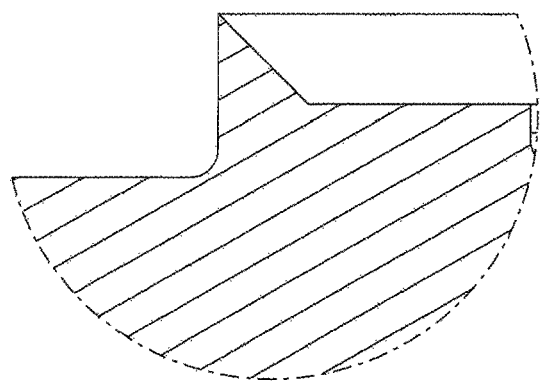
FIG. 25 is a detailed sectional view of a cutting profile of a retaining ring according to one embodiment.

FIGS. 25-27 illustrate different cutter profiles 300a, 300b, 300c that include a straight slope, a curved slope, and grooves or teeth formed in the slope, respectively. One skilled in the art will understand that any of the cutter profiles disclosed herein may be utilized with any of the embodiments described herein.

Figure 28:
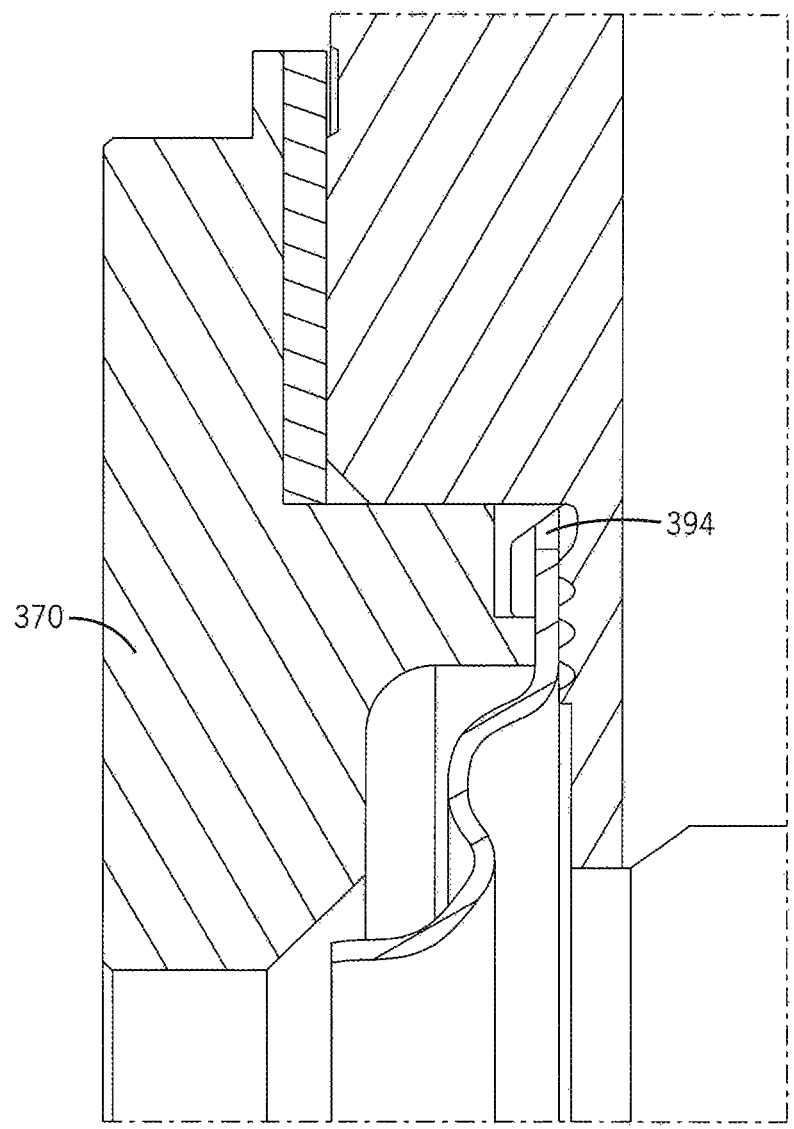
FIG. 28 is a detailed sectional view of a butterfly valve according to yet another embodiment.

FIG. 28 shows another retaining ring 370 that includes a cutter 394 that is a separate component and not formed as a part of the retaining ring 370. The assembly of FIG. 28 is assembled in the same manner as described with respect to FIG. 16 and generally includes the same components and features of FIGS. 1-16, except that the cutter is a separate component. In this manner, the cutter 394 may be placed against the retaining ring 370 or may attached to the retaining ring 370, for example, by an adhesive or any other suitable attachment mechanism.

In traditional manufacturing methods, the gasket is cut to size and then installed into the valve. As a valve increases in size, a critical ratio in gasket design is reached of outer diameter versus width of the seat retaining ring seal. Large gaskets become too delicate to manufacture and install. A traditional solution is to add a metal sleeve to increase gasket strength. These prior solutions are rendered unnecessary by the above embodiments.

Some embodiments of the invention allow for the insertion of sealing media into difficult sealing areas where small surface areas and large diameters make traditional gasket construction difficult or impossible. Some embodiments of the invention allow for large outside diameter gaskets with relatively small cross-sectional area sealing surfaces. The cutter acts as a shearing device on the gasket media during valve assembly.

Some embodiments of the invention allow a distinct commercial advantage by removing a manufacturing process. Some embodiments of the invention increase the sealing surface area by allowing for sealing on multiple planes from a single body gasket. Some embodiments of the invention eliminate the need for additional support material in large size valve gaskets. The cutter self-centers the body gasket during assembly. Some embodiments of the invention allow gasket material to be pulled from a single "roll" for assembly.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Further, those skilled in the art will understand that any features of any of the embodiments disclosed herein may be utilized with any of the embodiments described herein, thereby providing varying embodiments. The entire disclosure of each patent and publication cited herein is incorporated by reference, as if each such patent or publication were individually incorporated by reference herein.

The seal assemblies of the present invention are designed for in-situ sizing where gasket material of a generic size can be used and specific dimensions required for sealing of the valve may be developed (e.g., by cutting) during installation.

Various features and advantages of the invention are set forth in the following claims.

The invention claimed is:

1. A valve comprising:
   a valve body;
   a valve element arranged within the valve body to selectively inhibit flow through the valve body; and
   a seal assembly including a body gasket and a retaining ring, the retaining ring including a cutter that is arranged to cut the body gasket during installation to form a two-plane seal by cutting the body gasket between the retaining ring and the valve body,
   wherein the body gasket is cut into first and second segments that are spaced apart along a flow axis of the valve.

2. The valve of claim 1, the seal assembly further comprising a metal seat with at least a portion of the metal seat positioned between the valve body and the second seal segment after assembly of the valve.

3. The valve of claim 2, further comprising a soft seat positioned between the metal seat and the valve body after assembly of the valve, the soft seat configured to engage and seal with a disk of the valve.

4. The valve of claim 1, wherein the cutter engages a shearing wall positioned along the valve body such that engagement of the cutter with the shearing wall cuts the body gasket.

5. The valve of claim 1, wherein the cutter is integral with the retaining ring.

6. The valve of claim 1, wherein the cutter is separate from the retaining ring.

7. A valve comprising:
   a valve body;
   a valve element arranged within the valve body to selectively inhibit flow through the valve body; and
   a seal assembly including a non-laminated graphite gasket and a retaining ring, the retaining ring including a cutter that is arranged to cut the gasket during installation to form a first portion defining a first segment having a first width and a second portion cut from the non-laminated graphite gasket during installation and defining a second segment having a second width that is less than the first width,
   wherein the first and second segments are spaced apart along a flow axis of the valve.

8. The valve of claim 7, the seal assembly further comprising a metal seat positioned between the valve body and the second segment after assembly of the valve.

9. The valve of claim 8, further comprising a soft seat positioned between the metal seat and the valve body after assembly of the valve, the soft seat configured to engage and seal with a disk of the valve.

10. The valve of claim 7, wherein the cutter is integral with the retaining ring.

11. The valve of claim 7, wherein the cutter is separate from the retaining ring.

12. A method of assembling a valve, the method comprising the steps of:
    providing a valve comprising a valve body, a valve element arranged within the valve body to selectively inhibit flow through the valve body, and a seal assembly including a body gasket and a retaining ring, the retaining ring including a cutter;
    positioning a metal seat against the valve body;
    positioning the body gasket adjacent the valve body such that at least a portion of the metal seat is positioned between the body gasket and the valve body;
    positioning the retaining ring adjacent the body gasket, such that the body gasket is positioned between the retaining ring and the valve body; and
    pressing the retaining ring into engagement with the body gasket, thereby cutting the body gasket with the cutter of the retaining ring.

13. The method of claim 12, further including the step of engaging the cutter against a shearing wall of the valve body to cut the body gasket.

14. The method of claim 12, further including the step of positioning a soft seat against the valve body prior to positioning the body gasket, the retaining ring, and the metal seat, such that the soft seat is positioned between the metal seat and the valve body.

15. The method of claim 12, wherein the cutting step includes cutting the body gasket into a first, outer segment having a first width and a second, inner segment having a second width, the second width being less than the first width.

16. The method of claim 15, wherein the first, outer segment is spaced apart from the second, inner segment along a flow axis of the valve.

17. The method of claim 15, wherein the method allows of sizing of first and second gasket segments during installation of the body gasket.

* * * * *